A. DALE.
BERRY PICKER.
APPLICATION FILED JAN. 2, 1912.
1,038,302.
Patented Sept. 10, 1912.
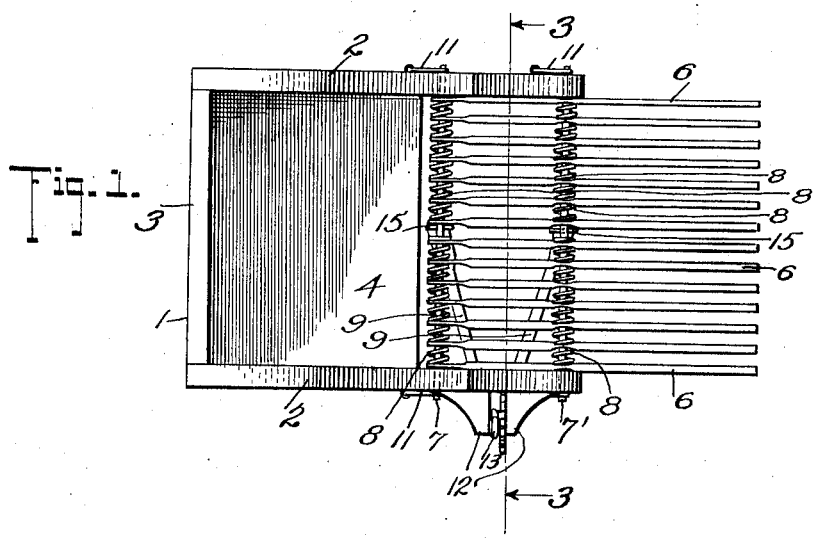
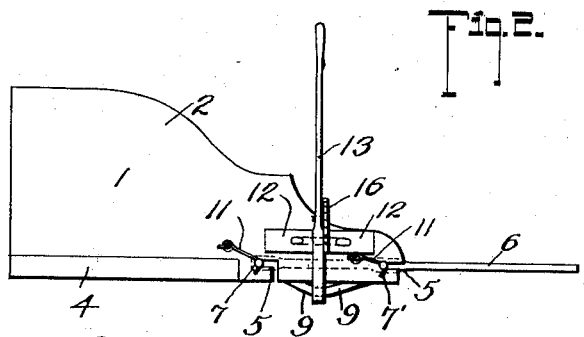
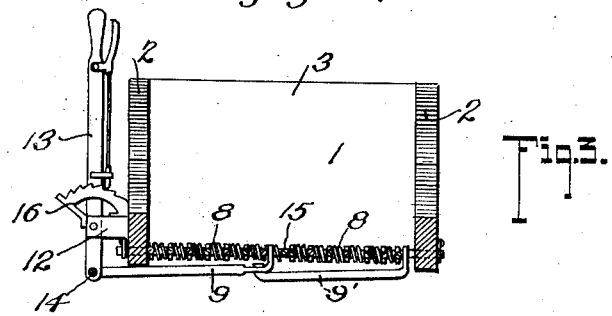
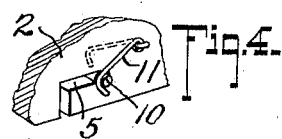
Witnesses
C. H. Wagner
H. C. Robb
Inventor
Andrew Dale
By Peters Robb
Robb
Attorneys

UNITED STATES PATENT OFFICE.

ANDREW DALE, OF FUNKLEY, MINNESOTA.

BERRY-PICKER.

1,038,302.   Specification of Letters Patent.   Patented Sept. 10, 1912.

Application filed January 2, 1912. Serial No. 668,922.

*To all whom it may concern:*

Be it known that I, ANDREW DALE, a citizen of Norway, residing at Funkley, in the county of Beltrami and State of Minnesota, have invented certain new and useful Improvements in Berry-Pickers, of which the following is a specification.

This invention relates to berry pickers, and its primary object is to provide a simple structure for picking berries, and the like, which may be readily adjusted according to the size of the berries for which it may be used.

A further object of the device is to provide a peculiar mounting for the picking fingers to permit of their easy removal and replacing in the event of breakage of one or more during the use of the invention.

With the above and other objects in view, this invention consists of the construction, combination, and arrangement of parts, all as hereinafter more fully described, claimed and illustrated in the accompanying drawings, wherein, Figure 1 represents a top plan view of my invention. Fig. 2 is a side elevation thereof. Fig. 3 is a transverse sectional view on the line 3—3 of Fig. 1. Fig. 4 is a detail perspective view of a portion of the side of the receptacle showing the means for holding the picker in position.

Throughout the following detail description and on the several figures of the drawings, similar parts are referred to by like reference characters.

Referring now to the drawings and specifically describing the invention, 1 designates the receptacle or box, composed of any material such as wood, and comprising the sides 2, the end 3, and the bottom 4. The sides 2 preferably extend a suitable distance beyond the bottom 4, the extending portions being formed with longitudinal slots 5 cut out near the bottom edges thereof.

Designated by the numeral 6 is a series of paralled longitudinally extending pickers or picking fingers preferably of steel or similar strong material, said fingers being mounted at their rear ends on the transverse rod 7 passing through each of said fingers and at a suitable point intermediate their lengths is provided a transverse rod 7' parallel with the rod 7 and passing through the fingers in like manner thereto. As will be noted from Fig. 1 of the drawings, each of the fingers is attenuated where mounted on the transverse rods to permit the openings therethrough to be properly made.

Mounted on the rods 7 and 7' are the spiral springs 8 between the coils of which, at proper intervals, the fingers 6 are inserted, said springs being adapted to hold the fingers in their proper operative relatively spaced positions.

Passing beneath the transverse rods are adjusting links comprising the members 9 and 9', the end of each of which is flattened and bent upwardly, being also provided with openings therein through which the said rods pass, the upturned portion of the members 9 being mounted centrally on the rods 7 and 7', while the upturned portions of the members 9' are mounted similarly between the extremities of the springs 8 and one side of the receptacle 1. The opposite extremities of the members 9' are also bent upwardly and pass through openings in the link members 9 at the adjoining ends thereof forming pivotal connections therefor. The pickers, as thus described, are adapted to be attached to the receptacle 1 by means of inserting the ends of the transverse rods 7 and 7' in the slots 5, the ends of said rods being provided with notches 10. Hooks 11, suitably secured to the sides of the receptacle 1, are then engaged in the notches 10, thereby securing and removably holding the pickers in position. The pickers, when in proper position, form an extension of the bottom 4 of the receptacle permitting the berries removed from vines or bushes to roll back or pass thereinto when the device is properly manipulated. At one side of the receptacle are provided spaced arms 12 between which is pivotally mounted an operating lever 13. The lower end of said lever 13 is provided with an opening 14 to receive the outer extremities of the link members 9.

Passing transversely through the rods 7 and 7' are the pins 15 located adjacent one side of the upturned portion of the link members 9, said pins being provided to hold the springs 8 in such a manner as to permit the relative adjustment of the spaced fingers when they are moved by the operating lever 13 aforesaid, as will be hereinafter more clearly set forth.

From the foregoing description, the operation of the invention will be readily understood. When picking cranberries or similar large berries, the fingers or pickers may be in their normal spaced position, as shown in Fig. 1, the receptacle being held in the hand of the operator who may readily manipulate the device to remove said berries from the vines or bushes, the berries thus removed passing along the fingers and into the receptacle 1. When, however, it is desired to use the device on small berries, such as huckleberries, or the like, the operating lever 13 is moved inwardly toward the receptacle 1 at its upper end, thus drawing the link members 9 and 9' to one side thereof, and by reason of the engagement of the upturned portions of said link members with the fingers 6, the springs will be compressed and the spaces therebetween being closed together. The proper adjustment of the fingers may be maintained by means of engaging the lever 13 with the notched segments 16, as most clearly shown in Fig. 3 of the drawings.

It will be seen that the separate fingers 6 may be easily replaced on the transverse rods 7 and 7' whenever they become broken in the operation of the device, this being accomplished by removing the pickers bodily from the receptacle 1. It will also be noted that the arrangement of the transverse rod 7' will greatly strengthen the fingers, being located at a point where the strain is greatest in removing berries from the vine.

As will be evident, the receptacle may be of any suitable material, such as wood, metal, or the like, and I do not wish to be limited in this respect.

Other details of construction may be made without departing from the spirit of the invention and within the scope of the claims hereto appended.

Having thus fully described the invention, what is claimed as new is:—

1. In a berry picker, the combination of a receptacle, picking fingers mounted thereon, and means to simultaneously actuate all of said fingers to relatively adjust them for use according to the size of berries to be operated upon.

2. In a berry picker, the combination of a receptacle, equally spaced picking fingers mounted thereon, and means for simultaneously actuating said fingers to relatively adjust them for use according to the size of the berries to be operated upon, said means maintaining the picking fingers equally spaced.

3. In a berry picker, the combination of a receptacle, picking fingers mounted thereon, a spring adapted to hold the fingers relatively spaced from each other, means on the receptacle to compress the spring and decrease the spaces between said fingers, and means carried by the receptacle to hold the fingers thereon and permit bodily removal thereof from the same.

4. In a berry picker, the combination of a receptacle, means for picking berries mounted thereon comprising spaced longitudinally extending fingers, transverse rods upon which said fingers are mounted, means for retaining the fingers in their normal relatively spaced position, and means for simultaneously adjusting the fingers closer together or farther apart.

5. In a berry picker, the combination of a receptacle comprising sides, bottom, and a closed end, said sides extending beyond the bottom and having slots in their lower edge portions, pickers removably mounted in the extending portions of the sides in alinement with the bottom aforesaid consisting of a series of spaced fingers, transverse rods adapted to be received in said slots and upon which said fingers are mounted, means secured to the sides of the receptacle to hold said rods in position on the receptacle, springs mounted on the rods and having the fingers located between the coils of said springs whereby the fingers may be held relatively spaced from each other, means also mounted on said rods and adapted to engage with the springs aforesaid, and means mounted on one side of the receptacle for operating the last mentioned means to lessen or increase the relative space between the fingers aforesaid.

6. In a berry picker, the combination of a receptacle comprising sides, bottom, and a closed end, said sides extending beyond the bottom and having slots in their lower edge portions, pickers removably mounted in the extending portions of the sides in alinement with the bottom aforesaid consisting of a series of spaced fingers, transverse rods adapted to be received in said slots and upon which said fingers are mounted, said rods having notches on their outer extremities, hooks pivotally mounted on the sides of the receptacle and adapted to engage with the notches of the rods to hold the pickers in position, springs mounted on the rods, and having the fingers located between the coils thereof whereby the fingers may be held relatively spaced from each other, links also mounted on the said rods at one end thereof engaging with the fingers, and an operating lever secured to one side of the receptacle and connected with the links whereby on operation of the lever said links will release and contract the springs and the relative space between said fingers may be increased or decreased.

In testimony whereof I affix my signature in presence of two witnesses.

ANDREW DALE.

Witnesses:
HENRY FUNKLEY,
M. H. FISHER.

Copies of this patent may be obtained for five cents each, by addressing the "Commissioner of Patents, Washington, D. C."